(12) United States Patent
LaChapelle et al.

(10) Patent No.: US 7,707,231 B2
(45) Date of Patent: Apr. 27, 2010

(54) CREATING STANDARDIZED PLAYLISTS AND MAINTAINING COHERENCY

(75) Inventors: Kevin Leigh LaChapelle, Redmond, WA (US); Brian James Walker, Duvall, WA (US); Ian Cameron Mercer, Sammamish, WA (US); Hiroshi Kase, Moriguchi (JP); Keisuke Matsuo, Ikoma (JP); Sako Asayama, Ikoma (JP)

(73) Assignees: Microsoft Corporation, Redmond, WA (US); Panasonic Corporation, Osaka (JP)

( * ) Notice: Subject to any disclaimer, the term of this patent is extended or adjusted under 35 U.S.C. 154(b) by 530 days.

(21) Appl. No.: 11/167,963

(22) Filed: Jun. 28, 2005

(65) Prior Publication Data
US 2006/0026634 A1    Feb. 2, 2006

Related U.S. Application Data

(63) Continuation-in-part of application No. 10/273,415, filed on Oct. 17, 2002, now Pat. No. 7,043,477.

(60) Provisional application No. 60/418,973, filed on Oct. 16, 2002.

(51) Int. Cl.
*G06F 17/30* (2006.01)
(52) U.S. Cl. .................. 707/804; 707/610
(58) Field of Classification Search .......... 707/201, 707/10
See application file for complete search history.

(56) References Cited

U.S. PATENT DOCUMENTS

| | | | |
|---|---|---|---|
| 5,428,732 A | 6/1995 | Hancock et al. | |
| 5,616,876 A | 4/1997 | Cluts | |
| 5,742,347 A | 4/1998 | Kandlur et al. | |
| 5,870,553 A | 2/1999 | Shaw et al. | |
| 5,892,535 A | 4/1999 | Allen et al. | |
| 5,996,015 A | 11/1999 | Day et al. | |
| 6,006,234 A | 12/1999 | Govindarajan et al. | |
| 6,199,059 B1 | 3/2001 | Dahan et al. | |
| 6,201,540 B1 | 3/2001 | Gallup et al. | |
| 6,212,524 B1 | 4/2001 | Weissman et al. | |

(Continued)

FOREIGN PATENT DOCUMENTS

JP    05-325500    10/1993

(Continued)

OTHER PUBLICATIONS

Notification of Transmittal of The International Search Report and the Written Opinion of the International Searching Authority in International Application No. PCT/US 06/15671, dated Sep. 13, 2007, 7 pgs.

(Continued)

*Primary Examiner*—John E Breene
*Assistant Examiner*—Thu-Nguyet Le
(74) *Attorney, Agent, or Firm*—Senniger Powers LLP (57) ABSTRACT

Updating automatically generated playlists in response to media content being edited. Aspects of the invention associate a playlist type or other code with each playlist to define the structure of the playlist. When media content is added to or deleted from a collection of media files, one or more playlist types corresponding to the media content are identified. The playlists with the identified playlist types are updated to reflect the addition or deletion of the media content.

20 Claims, 4 Drawing Sheets

U.S. PATENT DOCUMENTS

| | | | |
|---|---|---|---|
| 6,240,407 B1 | 5/2001 | Chang et al. | |
| 6,256,031 B1 | 7/2001 | Meijer et al. | |
| 6,263,341 B1 | 7/2001 | Smiley | |
| 6,269,394 B1 | 7/2001 | Kenner et al. | |
| 6,282,548 B1 | 8/2001 | Burner et al. | |
| 6,311,194 B1 | 10/2001 | Sheth et al. | |
| 6,356,921 B1 | 3/2002 | Kumar et al. | |
| 6,363,377 B1 | 3/2002 | Kravets et al. | |
| 6,389,426 B1 | 5/2002 | Turnbull et al. | |
| 6,405,215 B1 | 6/2002 | Yaung | |
| 6,430,575 B1 | 8/2002 | Dourish et al. | |
| 6,441,832 B1* | 8/2002 | Tao et al. | 715/723 |
| 6,446,080 B1 | 9/2002 | Van Ryzin et al. | |
| 6,449,341 B1 | 9/2002 | Adams et al. | |
| 6,484,156 B1 | 11/2002 | Gupta et al. | |
| 6,526,411 B1 | 2/2003 | Ward | |
| 6,557,042 B1 | 4/2003 | He et al. | |
| 6,657,117 B2 | 12/2003 | Weare et al. | |
| 6,661,437 B1 | 12/2003 | Miller et al. | |
| 6,721,489 B1 | 4/2004 | Benyamin et al. | |
| 6,728,729 B1 | 4/2004 | Jawa et al. | |
| 6,735,628 B2 | 5/2004 | Eyal | |
| 6,760,721 B1 | 7/2004 | Chasen et al. | |
| 6,832,293 B1* | 12/2004 | Tagawa et al. | 711/115 |
| 6,839,059 B1 | 1/2005 | Anderson et al. | |
| 2001/0001160 A1 | 5/2001 | Shoff et al. | |
| 2001/0011284 A1 | 8/2001 | Humpleman et al. | |
| 2001/0016851 A1 | 8/2001 | Gramsamer et al. | |
| 2002/0026521 A1 | 2/2002 | Sharfman et al. | |
| 2002/0033844 A1 | 3/2002 | Levy et al. | |
| 2002/0078144 A1 | 6/2002 | Lamkin et al. | |
| 2002/0082730 A1 | 6/2002 | Capps et al. | |
| 2002/0122137 A1 | 9/2002 | Chen et al. | |
| 2002/0151363 A1 | 10/2002 | Letovsky et al. | |
| 2002/0161911 A1 | 10/2002 | Pinckney, III et al. | |
| 2002/0172495 A1 | 11/2002 | Han | |
| 2002/0180803 A1 | 12/2002 | Kaplan et al. | |
| 2003/0009452 A1 | 1/2003 | O'Rourke et al. | |
| 2003/0016950 A1 | 1/2003 | Ando et al. | |
| 2003/0023975 A1 | 1/2003 | Schrader et al. | |
| 2003/0028505 A1 | 2/2003 | O'Rourke et al. | |
| 2003/0108335 A1 | 6/2003 | Nakamura et al. | |
| 2003/0151618 A1 | 8/2003 | Johnson et al. | |
| 2003/0221541 A1 | 12/2003 | Platt | |
| 2003/0229672 A1 | 12/2003 | Kohn | |
| 2004/0001106 A1 | 1/2004 | Deutscher et al. | |
| 2004/0003398 A1 | 1/2004 | Donian et al. | |
| 2004/0015401 A1* | 1/2004 | Lee et al. | 705/16 |
| 2004/0019396 A1 | 1/2004 | McMahon et al. | |
| 2004/0024823 A1 | 2/2004 | Del Monte | |
| 2004/0064476 A1 | 4/2004 | Rounds | |
| 2004/0093384 A1 | 5/2004 | Shipp | |
| 2004/0215718 A1 | 10/2004 | Kazmi et al. | |
| 2005/0021500 A1 | 1/2005 | Plastina et al. | |
| 2006/0168340 A1* | 7/2006 | Heller et al. | 709/242 |
| 2007/0025194 A1 | 2/2007 | Morse et al. | |

FOREIGN PATENT DOCUMENTS

| | | |
|---|---|---|
| WO | WO 01/28222 A2 | 4/2001 |
| WO | WO 03/023781 A1 | 3/2003 |

OTHER PUBLICATIONS

Hu et al., "Multimedia Description Framework (MDF) for content description of Audio/Video Documents," Proceedings of the fourth ACM conference on Digital libraries, 1999, pp. 67-75, ACM Press, New York, U.S.A.

Mueller, "Mediacaptain—an Interface for Browsing Streaming Media," Proceedings of the eighth ACM international conference on Multimedia, 2000, p. 419-421, ACM Press, New York, U.S.A.

Crossen et al., "Flytrap: Intelligent Group Music Recommendation," Proceedings of the 7th international conference on Intelligent user interfaces, 2002, pp. 184-185, ACM Press, New York, U.S.A.

Dunne et al., "mpME!: Music Recommendation and Exploration," Proceedings of the 7th international conference on Intelligent user interfaces, 2002, p. 235, ACM Press, New York, U.S.A.

Unknown, "What is MPV?," Specifications: MPV, 2001, 2 pages, Optical Storage Technology Association, U.S.A.

Unknown, "Creating and Using Playlists," Windows Media, 2005, 2 pages, Microsoft Corporation, U.S.A.

Unknown, "To Create a Playlist Using the Windows Media Playlist Editor," Windows Media Services 9 Series, 2000-2003, 2 pages, Microsoft Corporation, U.S.A.

* cited by examiner

CREATING STANDARDIZED PLAYLISTS AND MAINTAINING COHERENCY

CROSS-REFERENCE TO RELATED APPLICATION

This application is a continuation-in-part of co-pending U.S. patent application Ser. No. 10/273,415, filed Oct. 17, 2002, entitled "Navigating Media Content via Groups within a Playlist," hereby incorporated by reference, which claims the benefit of U.S. Provisional Patent Application Ser. No. 60/418,973, filed Oct. 16, 2002, entitled "COMPRESSED MEDIA FORMAT SPECIFICATION," now abandoned.

BACKGROUND

Due to recent advances in technology, computer users are now able to enjoy many features that provide an improved user experience, such as playing various media and multimedia content on their personal or laptop computers. For example, most computers today are able to play compact discs (CDs) so users can listen to their favorite musical artists while working on their computers. Many computers are also equipped with digital versatile disc (DVD) drives enabling users to watch movies.

In some multimedia environments, a computer has access to a computer-readable medium storing compressed media files such as Moving Picture Experts Group audio layer-3 (MP3) files and WINDOWS MEDIA technologies audio (WMA) files. When the media files are rendered on a computer, the computer typically has access to a database storing metadata describing albums, artists, genres, years, or the like for the media files. The computer typically organizes the media files into playlists based on the metadata when the compressed media files are played on the computer. For example, in the case of audio media files, the files may be organized by album, artist, genre, year, or some user specified selection and ordering. This allows users to easily have access to all of their content regardless of whether or not the users manually created a playlist.

However, when compressed media files are transferred from the computer to an optical format such as CD or DVD for playback on a portable CD player, DVD player or other consumer electronic devices having a low-power processor, limited memory and often limited display and user input capabilities, the media files traditionally lose much of the functionality offered by metadata databases hosted on devices with greater computing power. For example, while a first device may be able to render a playlist authored by a second device, the first device may not be able to identify the type of the playlist. In one example, the first device may generically identify as "Playlist 1" an "All Songs by Genre" playlist created by the second device, possibly due to an inability by the first device to interpret the headers of the playlist generated by the second device. Some existing systems lack a mechanism for interpreting the intent of a playlist and identifying playlists to all playback devices.

Some existing systems also lack a mechanism for marking or identifying outdated playlists. For example, a user may add or delete content, but a playback device with limited processing and/or memory capability may not be able to update any of the playlists or identify an outdated playlist to another device.

Accordingly, a system for creating standardized playlists and maintaining coherency on multiple authoring devices is desired to address one or more of these and other disadvantages.

SUMMARY

Embodiments of the invention provide a way for automatically generated playlists to be kept consistent when a device changes media content stored thereon through edits (e.g., additions or deletions). In an embodiment, the invention extends rich playlist functionality by tagging each playlist with a code which defines the structure of the playlist and enables a device or software to identify the playlists needing to be updated when new content is added or deleted. If a device is processor constrained to such an extent that it cannot update a playlist, the device sets an inconsistency flag or the like which indicates to other devices and software that the media content has changed. The next time the media content is operated on by a device or software with authoring capability the playlists are reauthored, rebuilt, or otherwise updated. Aspects of the invention provide a consistent user experience throughout a media environment.

Alternatively, aspects of the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
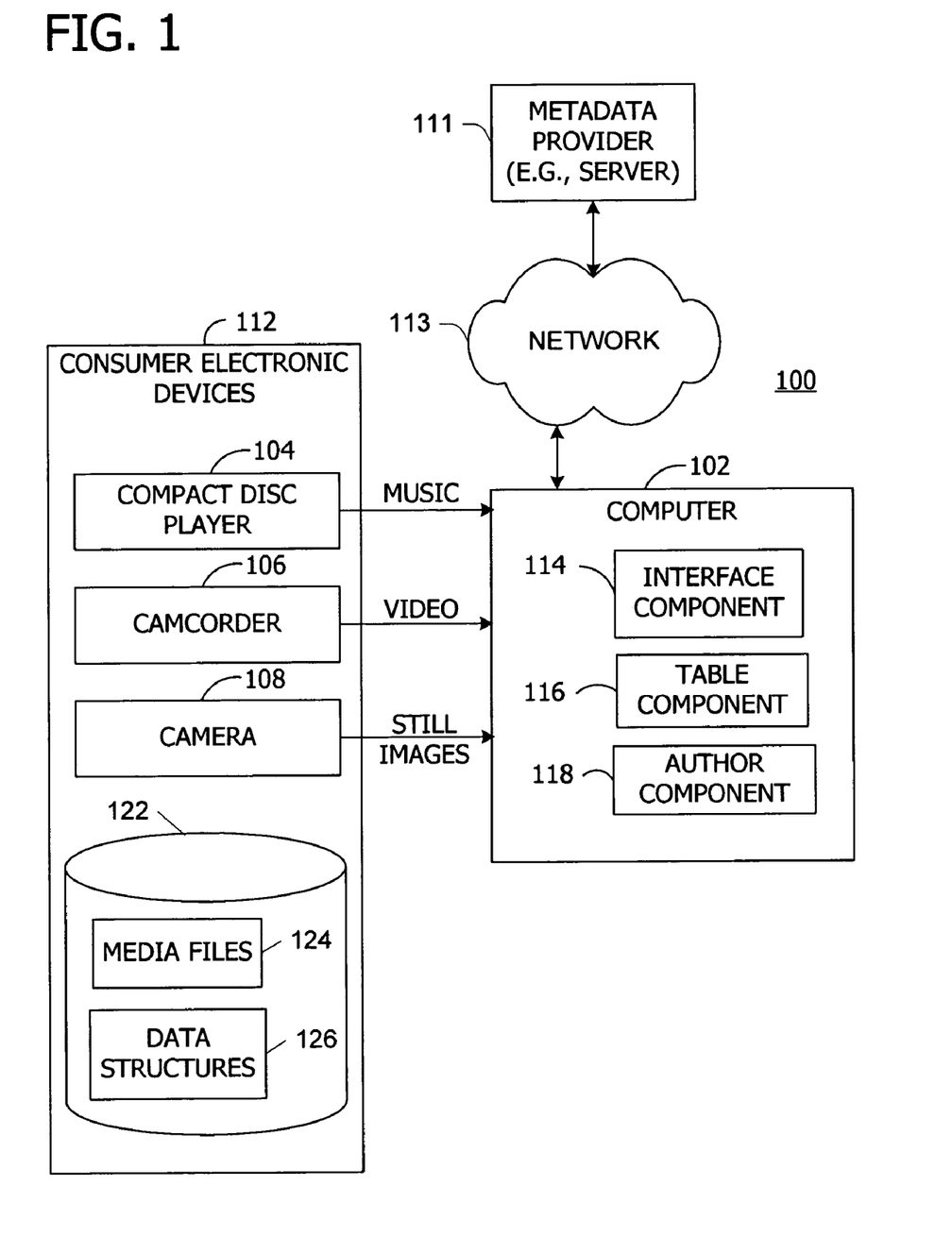
FIG. 1 is a block diagram illustrating an exemplary media environment in which the invention may be implemented.

Referring first to FIG. 1, a block diagram illustrates an exemplary media environment in which the invention may be implemented. A system 100 has one or more computers 102 coupled to one or more consumer electronic devices 112 providing media content including audio data, video data, and/or still image data. For example, the devices 112 may include a compact disc (CD) player 104, a camcorder 106, or a camera 108. Additionally, the devices 112 may include other personal computers, removable hard drives, network shares, a Moving Picture Experts Group audio layer-3 (MP3) player, an audio system in an automobile, a personal digital assistant, a cellular telephone, or the like. The consumer electronic devices 112 may include any suitable rendering filter or media player or device (e.g., a portable media device) that is configured to render digital media so that the user can experience the content that is embodied on the consumer electronic device 112. For example, suitable media player applications include a compact disc (CD) media player and a digital versatile disc or digital video disc (DVD) media player. The computer 102 also has rendering capability including a processor and rendering software (e.g., a media player).

A media environment typically has playlists generated from a plurality of media files stored on a computer-readable medium. When dealing with large quantities of media files and/or devices that can add and delete media files from the computer-readable medium, there is a need to keep generated playlists up to date to provide the user with a consistent experience. In an embodiment, the invention associates a code with each playlist to identify the structure of the playlist. In particular, the invention tags each playlist with a 'Playlist Type' field, an inconsistency flag, or other code which enables the authoring software or device to know which playlists to update when media content is added or deleted.

The consumer electronic devices 112 or computer 102 may have access to one or more computer-readable media (e.g., memory area 122). While the memory area 122 is illustrated to be part of any of the consumer electronic devices 112 in FIG. 1, the memory area 122 may be separate from the consumer electronic devices 112 yet accessible to the consumer electronic devices 112, for example, via a network. In one embodiment, memory area 122 includes one or more computer-readable media for storing a plurality of media files 124 and a plurality of data structures 126. Each of the plurality of data structures 126 represents a playlist. Each of the data structures 126 stores a list of media files representing the playlist. The list of media files is selected from the plurality of media files 124. Each of the data structures 126 has a playlist type field storing a value identifying the playlist as a user-created playlist or an automatically generated playlist. Each of the data structures 126 further has an inconsistency field storing a value indicating whether the playlist is out-of-date with respect to the plurality of media files 124.

One aspect of the present invention enables the user or, particularly, enables a media player program executing on computing device 112, to access, retrieve, and display for the user, so-called metadata. Those skilled in the art are familiar with metadata, which is simply information about data. In the context of the illustrated embodiment, metadata includes information related to specific content of a digital media file being played on the media player. Basic metadata includes, but is not limited to, title, performer, genre, track number, and the like. Extended metadata includes, but is not limited to, cover art, composer, description of content, performer biographies, reviews, ratings, related performers, where to buy similar items, upcoming concerts, ticket sales, URLs to other related experiences including purchase opportunities, studio, director, and the like. In one embodiment, extended metadata may be organized into two main categories: metadata retrieved or downloaded, and metadata computed from the media file (e.g., digital signal processing of the file stream). The metadata may be stored within the media file or stored in another file accessible and known to the media file.

In one embodiment, the consumer electronic devices 112 (e.g., a portable media device) are configured to execute computer-executable instructions for identifying a content edit. The content edit indicates media content to be added to or deleted from a plurality of media files 124 stored on an accessible computer-readable medium such as memory area 122. The media content has metadata associated therewith. The consumer electronic devices 112 are further configured to determine, as a function of the metadata, one or more of the data structures 126 affected by the identified content edit. The consumer electronic devices 112 are further configured to set the value in the inconsistency field for each of the determined data structures 126.

The computer 102, or other device or software with playlist authoring capability, also has one or more exemplary modules or components for implementing aspects of the invention. For example, the computer 102 may have an interface component 114, a table component 116, and an author component 118. The interface component 114 identifies a content edit. The content edit indicates the media content to be added to or deleted from the plurality of media files 124. The media content has metadata associated therewith. The table component 116 determines, as a function of the metadata, one or more of the playlists affected by the content edit identified by the interface component 114. In one embodiment, the table component 116 determines the one or more playlists by identifying playlists having a predefined playlist type. For example, if the metadata associated with the media content indicates that the media content is a song, then the playlists affected by the media content include those automatically generated playlists containing songs (e.g., "fall songs by artist," "all songs by album," etc.). In another example, if the metadata associated with the media content indicates that the media content is an image file, then the playlists affected by the media content include those automatically generated playlists containing image files.

The author component 118 updates the playlists determined by the table component 116 per the received content edit. The table component 116 and the author component 118 execute automatically in response to execution of the interface component 114. In an embodiment in which the content edit identified by the interface component 114 indicates that the media content is to be added to the computer-readable medium, the author component 118 updates the playlists determined by the table component 116 by reauthoring the playlists identified by the table component 116 with the media content. In an embodiment in which each of the playlists has an inconsistency flag associated therewith, the author component 118 updates each of the playlists having an inconsistency flag that is set.

Those skilled in the art will note that the invention software may be implemented with any number and organization of components or modules. That is, the invention is not limited to the specific configuration of the interface component 114, the table component 116, and the author component 118, but may include more or less components having more or less individual functionality than described herein. Further, the invention may be embodied in hardware, software, or a combination thereof in a media player, operating system, DVD recorder, CD recorder, video camera, hard drive, flash drive, personal digital assistant, wireless device (e.g., cellular telephone), or the like.

In one example, additional metadata is available from the metadata provider 111 via a data communication network 113. The computer 102 and metadata provider 111 are coupled to the data communication network 113. While the network 113 includes the Internet in one example, the teachings of the invention may be applied to any data communication network. Data communication network 113 may support, for example, client/server communications or peer-to-peer connections.

Figure 2:
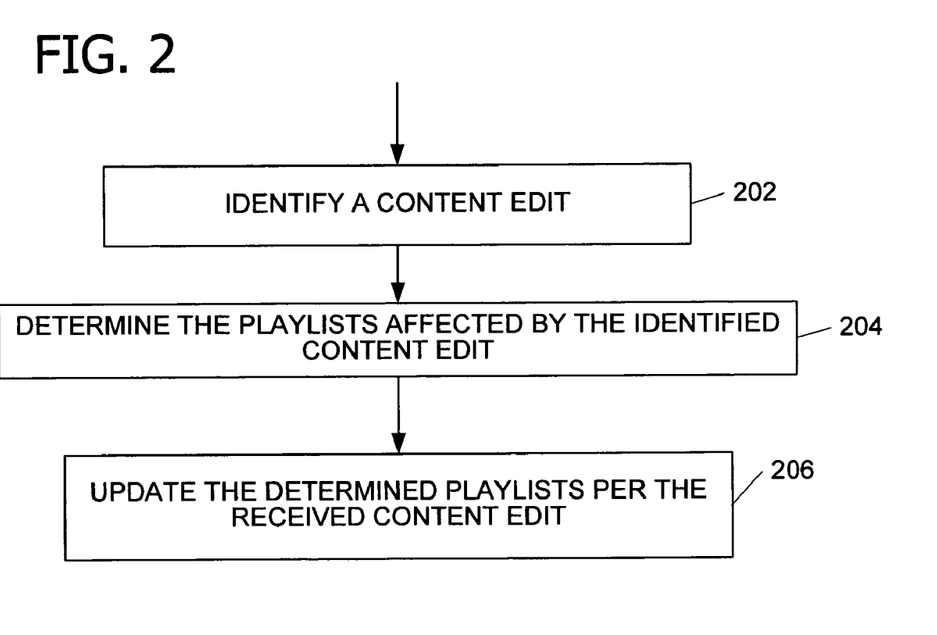
FIG. 2 is an exemplary flow chart illustrating operation of an embodiment of the invention.

Referring next to FIG. 2, an exemplary flow chart illustrates operation of an embodiment of the invention in a media environment having playlists. The playlists are automatically generated from a plurality of media files stored on a computer-readable medium. The flow chart in FIG. 2 illustrates a method for updating the playlists. The method includes identifying a content edit at 202. The content edit indicates media content to be added to or deleted from the plurality of media files. The media content has metadata associated therewith. The method also includes determining, as a function of the metadata, one or more of the playlists affected by the identified content edit at 204. In one embodiment, determining the one or more playlists includes identifying playlists having a predefined playlist type corresponding to the metadata. The method further includes updating the determined playlists per the received content edit at 206. The determining and updating occur automatically in response to identifying the content edit.

If the identified content edit indicates that the media content is to be added to the computer-readable medium, the method updates the determined playlists by reauthoring the determined playlists with the media content. If the identified content edit indicates that the media content is to be deleted from the computer-readable medium, the method updates the determined playlists by reauthoring the determined playlists without the media content.

In one example, the playlist type may include a 7- or 8-bit value representing an integer. An exemplary list of playlist types is shown below in Table 1. The playlist type definitions shown in Table 1 are only exemplary. Users, manufacturers, and the like may define other playlist types.

TABLE 1

Exemplary Playlist Types and Corresponding Values and Descriptions.

| Playlist Type | Value | Description |
| --- | --- | --- |
| 0 | User Playlist | A user created playlist or one like a .M3U, .WPL, etc. |
| 1 | All Songs by Artist | All of the songs grouped by Artist Name in ascending order. |
| 2 | All Songs by Genre | All of the songs grouped by Genre Name in ascending order. |
| 3 | All Songs by Album | All of the songs grouped by Album Name in ascending order. |
| 4 | Individual Artist | One playlist containing all of the songs for a single Artist. |
| 5 | Individual Album | One playlist containing all of the songs for a single Album sorted in ascending track number order. |
| 6 | Individual Genre | One playlist containing all of the songs for a music Genre. |
| 7 | All Images | All of the images in a single playlist grouped by the directory that they are in. |
| 8 | Video | A playlist that contains a single Video File. |
| 9–127 | Reserved | Reserved for future use. |

When a device according to the invention adds a new media file, the device adds the new media file to all of the relevant playlists. For example, if the media file is a song, then all playlists of types 1-6 are updated. If the media file is an image, then the playlists of type 7 are updated. If the device does not have sufficient resources (e.g., computing power or memory) to update the relevant playlists, then the device sets an inconsistency flag for each of the relevant playlists. The inconsistency flag is used by authoring devices or software to know whether a playlist is out-of-date. For example, an inconsistency flag that is set (e.g., set to one or true) indicates that a data set (e.g., the media files) has changed but that changes to the playlists have not been performed. A set inconsistency flag triggers an authoring device or software to rebuild, re-author, or recreate the particular playlist with the set inconsistency flag. Similarly, an inconsistency flag that is not set (e.g., set to zero or false) indicates that the playlist is up-to-date with any changes that may have occurred to the data set.

The inconsistency flag may be any code or indicator conveying a state of a playlist. In other embodiments, for example, the code may be a consistency flag which is set to indicate that the playlist is up-to-date and not set when the playlist has been determined to be out-of-date. The code may be represented by a single-bit value, an eight-bit value, or any number of bits.

In one example, a rendering device or software determines a status of a playlist being rendered and conveys that information to a user. For example, the rendering device determines whether or not the inconsistency flag has been set. If the rendering device lacks sufficient resources to update a playlist that has a set inconsistency flag, the device informs the user of the out-of-date status of the playlist. For example, the device may shade the playlist name gray to identify to the user that the playlist is outdated.

The playlist types may also be used when creating new playlists. For example, a method according to the invention for creating automatically generated playlists includes automatically selecting one or more of a plurality of media files as a function of an item of metadata. For example, the metadata may indicate whether the media content includes audio content, video content, or image content. The method further includes creating a playlist with the selected media content. The created playlist includes a playlist header. The method further determines a playlist type to be associated with the created playlist wherein the determined playlist type corresponds to the item of the metadata. The method adds the determined playlist type to the playlist header.

For user-created playlists, a method of the invention includes receiving a list of user selected content. The method further includes creating a playlist with the received list of user selected content and adding a particular playlist type to the created playlist. The particular playlist type identifies the playlist as being user created.

One aspect of the invention (not shown in FIG. 2) includes rendering the media content from one of the playlists, determining a string name associated with said one of the updated playlists as a function of the predefined playlist type, and displaying the determined string name to a user.

One or more computer-readable media have computer-executable instructions for performing the method illustrated in FIG. 2.

Figure 3:
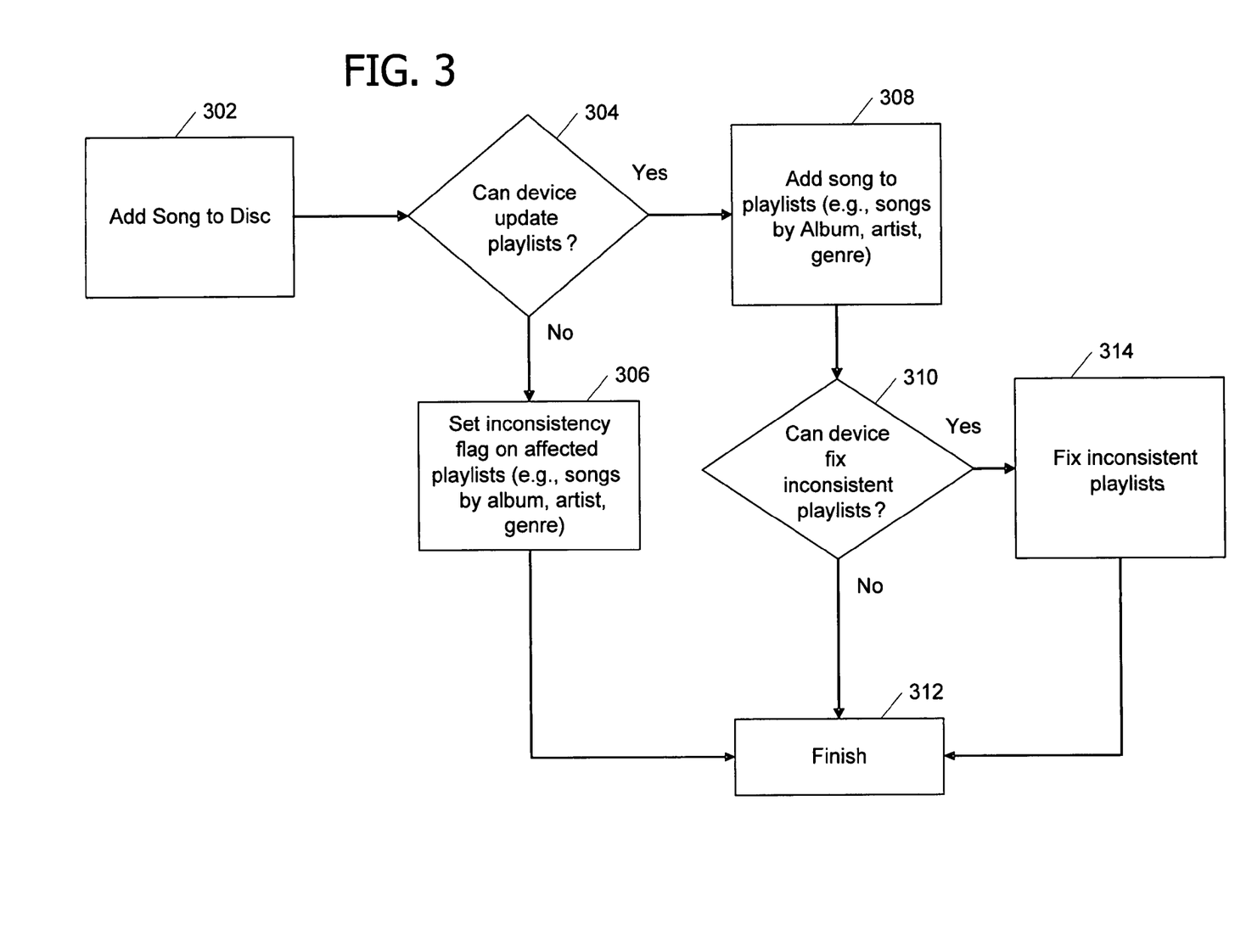
FIG. 3 is an exemplary flow chart illustrating adding a song to a computer-readable medium according to an embodiment of the invention.

Referring next to FIG. 3, an exemplary flow chart illustrates adding a song to a computer-readable medium (e.g., a disc) in one embodiment. At 302, a song is to be added to the disc by a device. If the device is not capable of updating playlists at 304, the inconsistency flag is set on affected playlists (e.g., all songs by album, artist, and genre) at 306 and the process finishes at 312. If the device is capable of updating playlists at 304, the song is added to the playlists at 308. If the device is capable of fixing (e.g., identifying and updating) inconsistent playlists at 310, the inconsistent playlists are fixed (e.g., identified and updated) at 314 and the process in this embodiment finishes at 312. If the device is not capable of fixing inconsistent playlists at 310, the process in this embodiment finishes at 312.

Examples

In an embodiment of the invention, a playlist file table stores information about the playlists (e.g., playlist files) on a device or computer-readable medium. The playlist file table includes a list of playlist file entries each corresponding to a playlist file. An exemplary format for each playlist file entry is shown below in Table 2.

TABLE 2

Playlist File Entry.

| Offset | Byte Length | Field Name |
|---|---|---|
| 0 | 4 | Playlist Identifier |
| 4 | 1 | Playlist Summary Type (e.g., Audio, Image, Video) |
| 5 | 1 | Playlist Type |

The playlist identifier is a 4-byte value that is a unique identifier that corresponds to this playlist. The playlist summary type is a 1-byte value summarizing the types of all the individual media files or playlist groups contained within the playlist. In one embodiment, the summary type is created by a logical OR of the values shown below in Table 3. The playlist summary type allows a particular device or software to filter the list of playlists to show only the playlists that can be rendered by the particular device or software.

TABLE 3

Values Used to Create the Playlist Summary Type.

| 5 Bits | 1 Bit | 1 Bit | 1 Bit |
|---|---|---|---|
| RESERVED | Image Flag | Video Flag | Audio Flag |

Exemplary values for the image flag, video flag, and audio flag in Table 3 are shown below in Table 4, Table 5, and Table 6, respectively.

TABLE 4

Image Flag.

| Image Flag | Value |
|---|---|
| $0_b$ | No Timed Image or Parallel Image Audio Playlist Group |
| $1_b$ | At least one Timed Image or Parallel Image Audio Playlist Group |

TABLE 5

Video Flag.

| Video Flag | Value |
|---|---|
| $0_b$ | No Video Playlist Group |
| $1_b$ | At least one Video Playlist Group |

TABLE 6

Audio Flag.

| Audio Flag | Value |
|---|---|
| $0_b$ | No Audio Playlist Group |
| $1_b$ | At least one Audio Playlist Group |

The playlist type is a 1-byte entry used to identify a playlist that should be updated or replaced by authoring software or devices when new media files are added to a computer-readable medium or old media files are removed from the computer-readable medium. When authoring software or recording devices do not update the playlist or all or part of any grouped playlists, the inconsistency flag is set to one. The inconsistency flag is set to zero if the playlist type is a user playlist.

TABLE 7

Playlist Type Field.

| 1 Bit | 7 Bits |
|---|---|
| Inconsistency Flag | Playlist Type |

Exemplary Operating Environment

Figure 4:
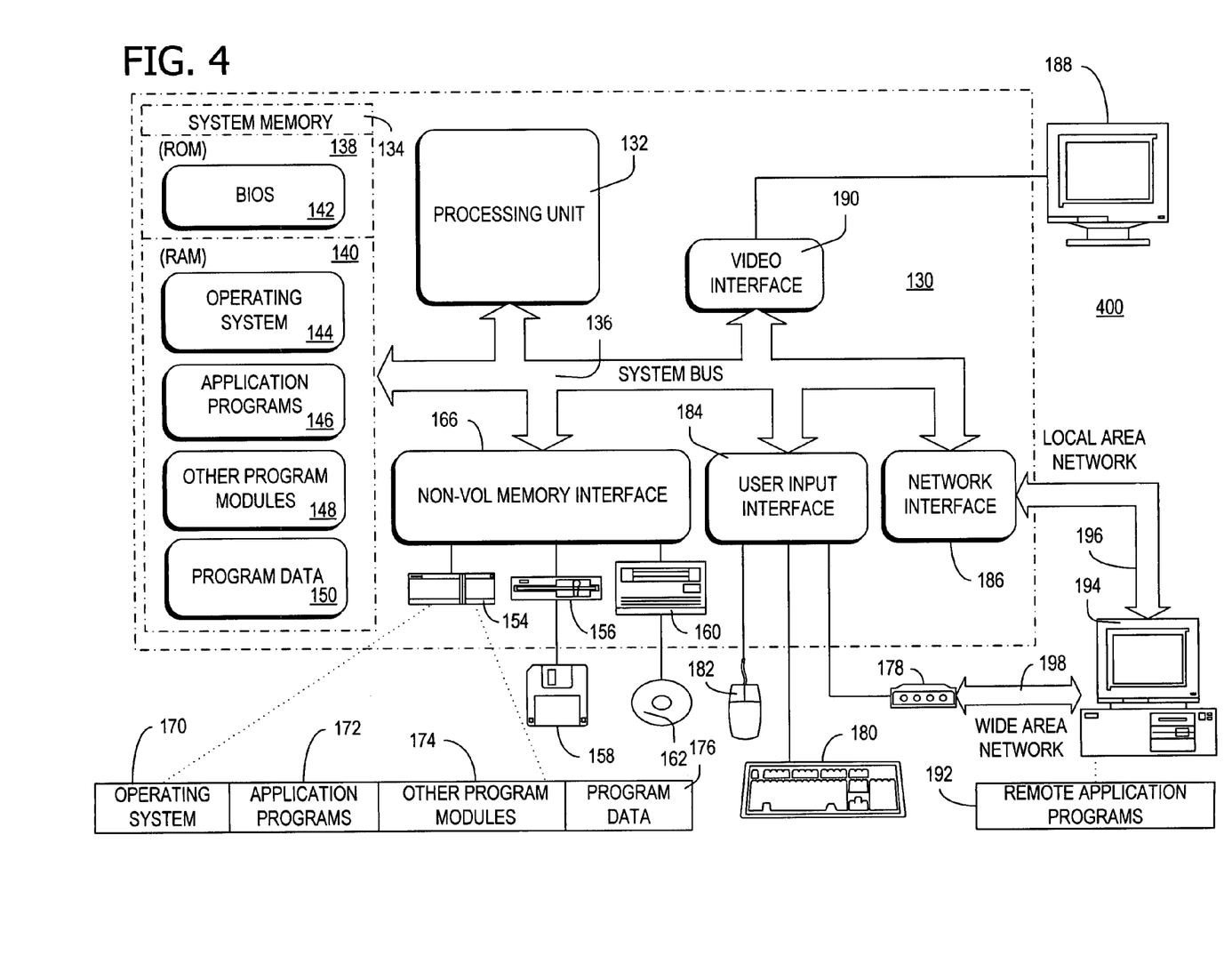
FIG. 4 is a block diagram illustrating one example of a suitable computing system environment in which aspects of the invention may be implemented.

FIG. 4 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 4 illustrates operating system 144, application programs 146, other program modules 148, and program data 150.

The computer 130 may also include other removable/non-removable, volatile/nonvolatile computer storage media. For example, FIG. 4 illustrates a hard disk drive 154 that reads from or writes to non-removable, nonvolatile magnetic media. FIG. 4 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 4, provide storage of computer readable instructions, data structures, program modules and other data for the computer 130. In FIG. 4, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 4 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 4 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in the figures to update an automatically generated playlist in response to a content edit indicating media content to be added to or deleted from a collection of media files. Computer-executable instructions (e.g., as software, hardware, or both), a file system driver, input/output driver, and an electronic device constitute exemplary means for identifying the content edit and exemplary means for determining the data structures (e.g., playlists) affected by the identified content edit.

In the examples described herein, the media content of the digital media file is described in the context of content embodied on a CD or a DVD. It is to be appreciated and understood that the media content may be embodied on any suitable media and that the specific examples described herein are given to further understanding of the inventive principles. For convenience, a digital media file refers to one or more files representing, for example, a single song track or a collection of tracks such as would be found on an audio CD. The media content may include, without limitation, specially encoded media content (e.g., audio, video, or still images) in the form of an encoded media file.

The exemplary media file operations illustrated in the drawings and described herein are merely exemplary. Other variations of these file operations are within the scope of the invention. Alternatively or in addition, other media file operations not described herein yet embodying the invention are also within the scope of the invention.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element is within the scope of the invention.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. In a media environment having playlists, each said playlist having a plurality of media files, said playlists being automatically generated from a plurality of media files stored on a computer-readable medium, a method for updating the playlists comprising:

identifying a content edit, said content edit indicating media content to be added to or deleted from the plurality of media files, said media content having metadata associated therewith;

in response to said identifying a content edit, determining, as a function of the metadata associated with the media content, one or more of the playlists inconsistent with the identified content edit;

in response to said determining, setting an inconsistency flag associated with each of the playlists inconsistent with the identified content edit, said set inconsistency flag indicating that the playlist is inconsistent with the identified content edit;

in response to said setting, identifying to a user each of the playlists having the inconsistency flag associated therewith that is set, wherein identifying to the user the playlists having the set inconsistency flag associated therewith comprises shading a name associated with each of said playlists having the inconsistency flag associated therewith that is set thereby indicating to the user that the shaded playlist is inconsistent with the media content to be added to or deleted from the plurality of media files; and in response to said identify playlists having the inconsistency flag, updating the playlists identified to the user per the received content edit so that the playlist has been fixed and is consistent with the identified content edit, wherein said determining, said setting of the inconsistency flag, and said updating occur automatically in response to said identifying the content edit.

2. The method of claim 1, wherein determining the one or more playlists comprises identifying playlists having a predefined playlist type, said predefined playlist type corresponding to the metadata.

3. The method of claim 2, wherein the playlist type comprises an 8-bit value.

4. The method of claim 3, wherein the 8-bit value represents an integer.

5. The method of claim 2, further comprising:

rendering the media content from one of the updated playlists;

determining a string name associated with said one of the updated playlists as a function of the predefined playlist type; and displaying the determined string name to a user.

6. The method of claim 1, wherein the identified content edit indicates that the media content is to be added to the computer-readable medium, and wherein updating the determined playlists includes reauthoring the determined playlists with the media content.

7. The method of claim 1, wherein the identified content edit indicates that the media content is to be deleted from the computer-readable medium, and wherein updating the determined playlists includes reauthoring the determined playlists without the media content.

8. The method of claim 1, further comprising:
automatically selecting one or more of the plurality of media files as a function of an item of the metadata;
creating a playlist with the selected media content, said created playlist including a playlist header;
determining a playlist type to be associated with the created playlist, said determined playlist type corresponding to the item of the metadata; and
adding the determined playlist type to the playlist header.

9. The method of claim 1, further comprising:
receiving a list of user selected content;
creating a playlist with the received list of user selected content; and
adding a playlist type to the created playlist, wherein the playlist type identifies the playlist as being user created.

10. The method of claim 1, wherein one or more computer-readable media have computer-executable instructions for performing the method recited in claim 1.

11. In a media environment having playlists, each said playlist having a plurality of media files, said playlists being automatically generated from a plurality of media files stored on a computer-readable storage medium, one or more computer-readable storage media having computer-executable components for updating the playlists, said components comprising:
an interface component for identifying a content edit, said content edit indicating media content to be added to or deleted from the plurality of media files, said media content having metadata associated therewith;
a table component for determining, as a function of the metadata associated with the media content, one or more of the playlists affected by the content edit identified by the interface component and setting an inconsistency flag associated with each of the playlists affected by the content edit, wherein the interface component further identifies to a user each of the playlists having the inconsistency flag associated therewith that is set, wherein the interface component identifies to the user the playlists having the set inconsistency flag associated therewith comprises shading a name associated with each of said playlists having the inconsistency flag associated therewith that is set thereby indicating to the user that the shaded playlist is inconsistent with the media content to be added to or deleted from the plurality of media files; and
an author component for updating the playlists determined by the table component and identified to the user per the received content edit, wherein the table component and the author component execute automatically in response to execution of the interface component.

12. The computer-readable storage media of claim 11, wherein the table component determines the one or more playlists by identifying playlists having a predefined playlist type.

13. The computer-readable storage media of claim 11, wherein the content edit identified by the interface component indicates that the media content is to be added to the computer-readable medium, and wherein the author component updates the playlists determined by the table component by reauthoring the playlists identified by the table component with the media content.

14. The computer-readable storage media of claim 11, wherein each of the playlists has an inconsistency flag associated therewith, and wherein the author component updates each of the playlists having an inconsistency flag that is set.

15. A system comprising:
a computer readable medium for storing:
a plurality of media files; and
a plurality of data structures each representing a playlist having a plurality of media files, each of said data structures storing a list of media files representing the playlist, said list of media files being selected from the plurality of media files, each of said data structures having a playlist type field storing a value identifying the playlist as a user-created playlist or an automatically generated playlist, each of said data structures further having an inconsistency field storing a value indicating whether the playlist is out-of-date with respect to the plurality of media files; and
a media device configured to execute computer-executable instructions for:
identifying a content edit, said content edit indicating media content to be added to or deleted from the plurality of media files stored on the computer-readable medium, said media content having metadata associated therewith;
determining, as a function of the metadata associated with the media content, one or more of the data structures affected by the identified content edit;
setting the value in the inconsistency field for each of the determined data structures; and
identifying to a user of the media device each of the determined data structures having the value set in the inconsistency field, wherein identifying to the user the data structures having the value set in the inconsistency field comprises shading a name associated with each of said data structures having the inconsistency field associated therewith that is set thereby indicating to the user that the shaded playlist is inconsistent with the media content to be added to or deleted from the plurality of media files.

16. The system of claim 15, further comprising means for identifying the content edit.

17. The system of claim 15, further comprising means for determining the data structures affected by the identified content edit.

18. The system of claim 15, wherein the media device comprises a media player, and the media player identifies each of the determined data structures having the value set in the inconsistency field to the user by shading a name associated with the data structure and displayed to the user by the media device.

19. The system of claim 15, wherein one or more of the following stored on the computer readable medium are compressed: the plurality of media files and the plurality of data structures.

20. The system of claim 15, wherein the media device is further configured to execute computer-executable instructions for updating each of the determined data structures with the identified content edit.

* * * * *